United States Patent [19]

Basu et al.

[11] 4,096,020

[45] Jun. 20, 1978

[54] APPARATUS FOR ATTACHING ADHESIVE-COATED BANDS TO PHOTOGRAPHIC FILMS OR THE LIKE

[75] Inventors: Prithwis Basu, Munich; Günter Neumann, Grunwald; Günther Kaiser, Munich, all of Germany

[73] Assignee: AGFA-Gevaert AG, Leverkusen, Germany

[21] Appl. No.: 415,384

[22] Filed: Nov. 13, 1973

[30] Foreign Application Priority Data

Nov. 17, 1972 Germany ............................ 2256364

[51] Int. Cl.[2] ............................................ B32B 31/00

[52] U.S. Cl. .................................... 156/519; 156/378; 156/552

[58] Field of Search ............... 156/358, 363, 364, 379, 156/519, 521, 552, 568; 73/157

[56] References Cited

U.S. PATENT DOCUMENTS

| | | | |
|---|---|---|---|
| 1,393,524 | 10/1921 | Grupe | 156/519 |
| 2,289,336 | 7/1942 | Bamford | 156/519 |
| 2,391,694 | 12/1945 | Everett | 156/364 |
| 2,699,676 | 1/1955 | Grunwald et al. | 73/157 |
| 2,958,365 | 11/1960 | Molins et al. | 156/519 |
| 2,990,081 | 6/1961 | De Neui et al. | 156/519 |
| 3,159,521 | 12/1964 | Pechmann | 156/519 |
| 3,226,282 | 12/1965 | Jackson | 156/519 |
| 3,508,995 | 4/1970 | Thompson | 156/364 |
| 3,514,363 | 5/1970 | Stone et al. | 242/58.1 |
| 3,576,695 | 4/1971 | Stine | 156/521 |
| 3,713,948 | 1/1973 | Kluger | 156/521 |
| 3,733,230 | 5/1973 | Prittie | 156/379 |
| 3,758,363 | 9/1973 | Frick | 156/519 |
| 3,772,120 | 11/1973 | Radzins | 156/521 |

*Primary Examiner*—David A. Simmons

*Attorney, Agent, or Firm*—Michael J. Striker

[57] ABSTRACT

Apparatus for attaching adhesive-coated bands to damaged portions of photographic films or the like has a suction drum which attracts the leader of an adhesive tape and cooperates with a heated wire to sever the leader and to thus form a succession of adhesive-coated bands which are attached to damaged portions of films. The attachment of bands can take place by moving the damaged portion of a film against the drum and/or by moving the drum against the damaged portion of the film. If the film is to be coated at both sides, it is caused to pass between two drums which can be located directly opposite each other or are spaced apart, as considered in the direction of lengthwise movement of the film.

19 Claims, 4 Drawing Figures

205
1
2
3
3a
4
4a
4b
5
5a
5b
5c
5d
5e
6
7
7a
7b
7c
8
8a
9
10
11
12
13
13a
14
15
15a
104
105
107
113
TS
5'
7'
15'
16
TS1
TS2
5A
5A'
5B
18
19
19'
19B
20
21

APPARATUS FOR ATTACHING ADHESIVE-COATED BANDS TO PHOTOGRAPHIC FILMS OR THE LIKE

BACKGROUND OF THE INVENTION

The present invention relates to apparatus for attaching adhesive-coated bands to defective portions of photographic films or to other commodities. More particularly, the invention relates to improvements in apparatus for automatically making, positioning and applying adhesive-coated bands, either singly or in pairs, to discrete commodities or to commodities which constitute selected (e.g., defective or weakened) portions of photographic films or other web-like flexible bodies.

It is known to transport photographic film, either singly or in the form of a series of films which are connected to each other end-to-end, through a developing or other processing machine. During transport, the films are subjected to tensional stresses which are likely to bring about tearing of films if the films exhibit weakened or defective portions in the form of partial tears, unsatisfactory splices or the like. Tearing of films in developing or like machines necessitates lengthy interruptions of treatment because the torn portions of films must be located, removed from the developing machine and spliced together in a time-consuming operation. The removal of film from the developing solution is an unpleasant task which the processing laboratories wish to avoid if at all possible.

It was already proposed to monitor discrete photographic films or webs consisting of spliced-together photographic films for the purpose of detecting and reinforcing defective or weakened film portions prior to introduction of films into a developing or other processing machine. Once a defective film portion is detected, it is reinforced by the application of one or more adhesive-coated bands in a manually operable device resembling somewhat a conventional splicer. Such operation involves severing one or more bands from a roll of tape one side of which is coated with adhesive, placing the severed band or bands onto the weakened portion of the film, and introducing the weakened portion into a press wherein the band or bands are urged against the adjacent portion or portions of the film. It will be readily appreciated that the just outlined procedure consumes a substantial amount of time which is particularly undesirable when the films are processed in automatic machinery. Moreover, manual severing of adhesive-coated tape and manual application of adhesive-coated bands to films require a certain amount of skill because the tape and/or bands tend to adhere to the operator's fingers and/or to the component parts of the press.

SUMMARY OF THE INVENTION

An object of the invention is to provide an automatic or semiautomatic apparatus which can be used for the making and attachment of adhesive-coated bands to photographic films or other commodities.

Another object of the invention is to provide an apparatus which can attach bands singly or in pairs and which can be combined with means for automatically placing selected commodities (for example, defective or weakened portions of photographic films or webs consisting of two or more photographic films) in an optimum position for the attachment of adhesive-coated bands thereto.

A further object of the invention is to provide the apparatus with novel and improved means for applying adhesive-coated bands to commodities in such a way that the entire adhesive-coated side of each band properly adheres to the respective commodity.

An additional object of the invention is to provide the apparatus with novel and improved severing means for converting adhesive-coated tape into bands of requisite length.

Still another object of the invention is to provide an apparatus which can be used for the application of single adhesive-coated bands or for simultaneous application of several adhesive-coated bands and which can be rapidly converted from operation for attachment of one band to operation for attachment of plural bands or vice versa.

An ancillary object of the invention is to provide an apparatus which though particularly suited for the application of bands to portions of photographic films or similar web-shaped bodies, is equally suited for the application of adhesive-coated labels or the like to discrete commodities.

A further object of the invention is to provide an apparatus which can use commercially available adhesive-coated tape, especially a tape which can be severed by melting in response to the application of heat.

An additional object of the invention is to provide a band attaching apparatus which requires little or no supervision and is capable of attaching large numbers of successive bands to an equally large number of commodities in a fully automatic way.

The invention is embodied in an apparatus for attaching adhesive-coated bands to photographic films or other commodities. The apparatus comprises positioning means which is arranged to locate successive commodities (for example, successive defective or weakened portions of an elongated photographic film or successive defective or weakened portions of a web consisting of several photographic films which are spliced together end-to-end) at a transfer station, a suction conveyor which is disposed at the transfer station and is normally spaced apart from a commodity which is located at the transfer station, a supply of adhesive tape, means for feeding tape from the supply to the suction conveyor so that the conveyor attracts the leader of the tape, means for severing the leader so that the later yields a succession of adhesive-coated bands, means for driving the conveyor so as to place successively formed bands into a predetermined position of register with successive commodities at the transfer station, and applicator means for contacting the commodity at the transfer station with the registering band so that the band adheres to the commodity.

The novel features which are considered as characteristic of the invention are set forth in particular in the appended claims. The improved attaching apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2, 3A, 3B:
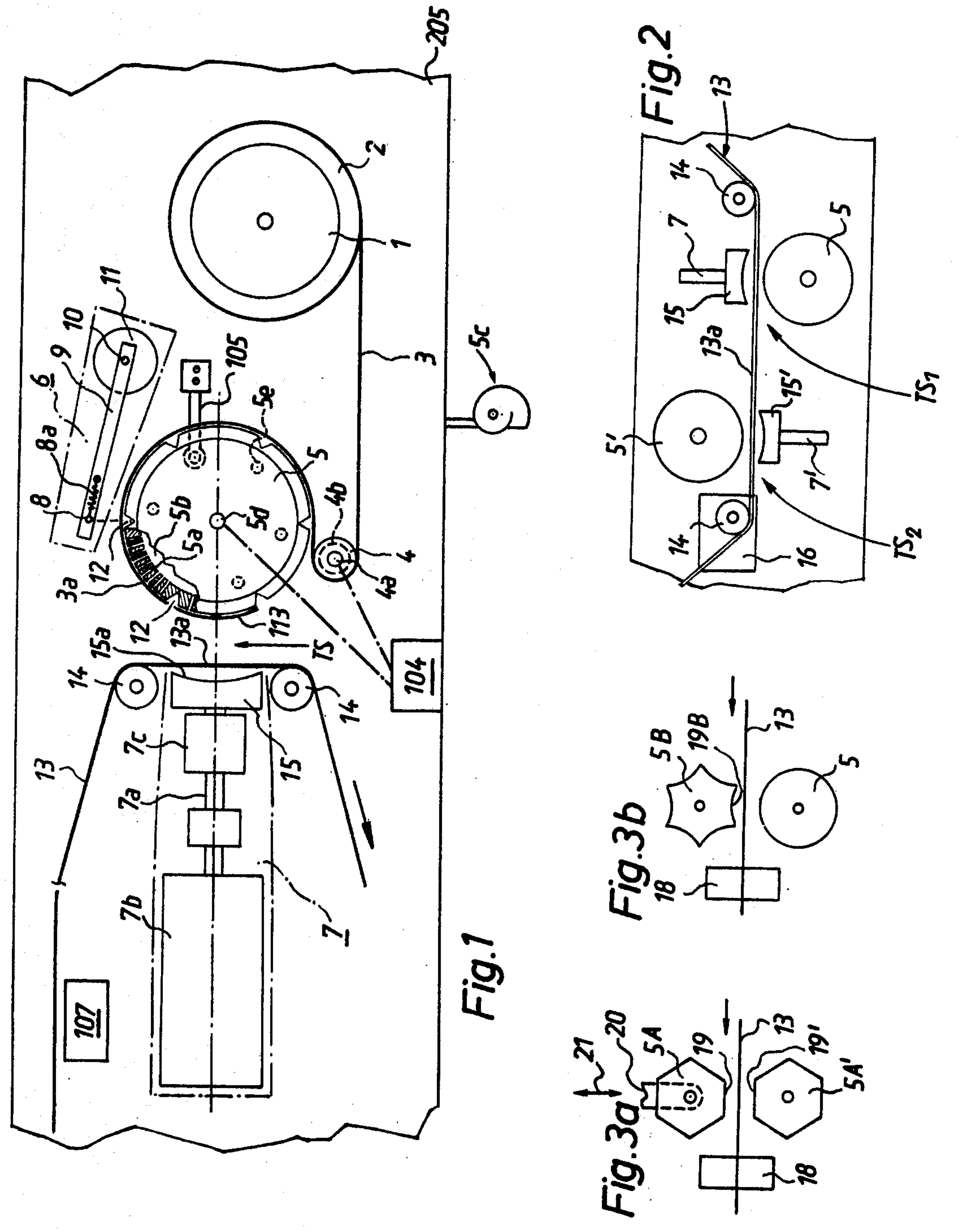
FIG. 1 is a fragmentary partly elevational and partly sectional view of an apparatus which embodies one form of the invention and is used to attach adhesive-coated bands to one side of a photograhic film.
FIG. 2 is a smaller-scale fragmentary elevational view of a modified apparatus which is used to attach bands to both sides of a photographic film.
FIG. 3*a* illustrates a portion of an apparatus which constitutes a first modification of the apparatus shown in FIG. 2.
FIG. 3*b* illustrates a portion of an apparatus which constitutes a second modification of the apparatus shown in FIG. 2.

FIG. 1 illustrates an apparatus which is utilized to attach adhesive-coated bands 113 to damaged portions 13*a* of films 13. The apparatus comprises a support 1 for a supply or roll 2 of adhesive tape 3 which is trained over an intermittently driven guide roll 4 and whose leader 3*a* adheres to the peripheral surface of a drum-shaped suction conveyor 5. The tape 3 is coated with a suitable adhesive at that side which faces away from the periphery of the conveyor 5. The conveyor 5 is formed with radially extending suction ports 5*a* which communicate with a suction chamber 5*b* connected to a suction generating device 5*c*, e.g., a fan. This insures that the uncoated side of the leader 3*a* of the tape 3 is attracted to the periphery of the conveyor 5.

The means for intermittently rotating the guide roll 4 comprises a shaft 4*a*, and the means for intermittently rotating the conveyor 5 comprises a shaft 5*d*. The prime mover 104 which rotates the shafts 4*a* and 5*d* preferably includes a motor and a transmission which insures that the peripheral speed of the conveyor 5 slightly exceeds the peripheral speed of the guide roll 4 in order to move successively formed adhesive-coated bands 113 forwardly and away from the leader 3*a* of the tape 3.

The severing device 6 for the tape 3 comprises a heated wire 8 which is parallel to the axis of the conveyor 5 and is mounted at the free end of a lever 9. The latter is pivotable on a pin 10 and can be pivoted by a drive 11 (e.g., a rotary electromagnet) so as to move the wire 8 toward or away from the periphery of the conveyor 5. The wire 8 is electrically heated, either continuously or in response to counterclockwise pivoting of the lever 9, so as to be capable of melting the material of the tape 3 and of thereby separating from the leader 3*a* of the tape 3 a band 113 whenever the lever 9 pivots in a direction to move the wire 8 against the leader 3*a* on the periphery of the conveyor 5. In order to avoid damage to the wire 8 and/or conveyor 5, as well as to insure the making of clean cuts across the tape 3, the periphery of the conveyor 5 is formed with axially parallel grooves or flutes 12 one of which registers with the wire 8 whenever the lever 9 is pivoted by the drive 11 in a direction to effect the severing of the leader 3*a* of the tape 3. The depth and width of the grooves 12 are selected in such a way that the wire 8 does not contact the conveyer 5 when the lever 9 reaches the end of its pivotal movement in the counter-clockwise direction. The ports 5*a* are distributed in those sections of the conveyor 5 which are located between the grooves 12, preferably in such a way that the distance between the neighboring suction ports 5*a* is less than the distance between the grooves 12 and the nearest suction ports.

In order to compensate for changes in the length of the wire 8 in response to heating and cooling, one or both ends of the wire are preferably attached to resilient compensating means in the form of helical springs or the like. A portion of a spring which connects one end of the wire 8 to the lever 9 is shown at 8*a*. It is clear that the lever 9 may carry other types of compensating means; for example, the ends of the wire 8 can be mounted in two clamps (not shown) which are biased apart to insure that the wire does not slacken in response to heating and to allow for shortening of the wire in response to cooling.

The apparatus further comprises positioning means in the form of two intermittently driven rollers 14 for the film 13. The film portion 13*a* between the positioning rollers 14 is located at a transfer station TS which further accommodates the freshly formed band 113 and the conveyor 5. An applicator 7 is provided to contact the film portion 13*a* with the adhesive-coated side of the band 113 at the transfer station TS whereby the band adheres to the film portion 13*a*.

The applicator 7 comprises a ram 15 having a concave front surface 15*a* and being mounted on the piston rod 7*a* of a double-acting pneumatic cylinder 7*b*. The piston rod 7*a* is reciprocable in a fixed guide sleeve 7*c*. The cylinder 7*b* is preferably actuated simultaneously with the drive 11 for the lever 9 so that the ram 15 performs a forward stroke and causes the film portion 13*a* to contact the adhesive-coated band 113 while the wire 8 severs the leader 3*a* of the tape 3 on the suction conveyor 5. The distance between neighboring grooves 12 on the conveyor 5 determines the length of successively formed bands 113.

In order to insure that the guide roll 4 can draw the tape 3 from the supply 2, the periphery of the roll 4 is preferably roughened or toothed, as shown at 4*b*. The likelihood of slippage between the periphery of the guide roll 4 and the tape 3 is negligible due to the fact that the guide roll 4 engages the adhesive-coated side of the tape. The provision of teeth 4*b* is desirable in order to reduce the area of contact between the roll 4 and the adhesive-coated side of the tape 3.

The means for actuating the drive 11, the prime mover 104 and the cylinder 7*b* comprises an apparatus 107 which monitors the film 13 for the presence of defects and causes the devices 11, 104 and 7 to pivot the lever 9, to advance the tape 3 and to cause the ram 15 to perform a working stroke whenever a defective portion (13*a*) of the film 13 occupies the position between the rollers 14 at the transfer station TS. As the ram 15 moves forwardly, its front surface 15*a* moves the film portion 13*a* against the registering band 113 at the periphery of the conveyor 5 and the band automatically adheres to the film portion 13*a* to overlie the damaged part, for example, a partially torn portion of the film.

If desired, a portion of or the entire ram 15 may consist of an elastomeric material (such as rubber or a synthetic plastic substance) to insure that the surface 15*a* can closely follow the outline of the registering portion of the conveyor 5. Furthermore, the conveyor 5 may also comprise an elastomeric outer layer, at least in the regions between the grooves 12, to further guarantee a proper transfer of bands 113 to the film portions 13*a* in such a way that the entire adhesive-coated side of each band adheres to the film.

The aforediscussed feature that the peripheral speed of the conveyor 5 at least slightly exceeds the peripheral speed of the guide roll 4 is desirable because the wire 8 is capable of making extremely clean cuts of negligible width. Thus, in the absence of a speed differential between 4 and 5, the front edge of the leader 3*a* of the tape 3 would be immediately adjacent to the trailing edge of the freshly severed band 113 which could interfere with proper transfer of the band onto a film portion. The formation of a gap between the leader 3*a* of the tape 3 and the freshly separated band 113 further reduces the likelihood of moving two bands 113 into register with the film portion 13*a* at the station TS.

The peripheral surface of the conveyor 5 is a circular cylindrical surface. However, it is equally within the purview of the invention to employ a suction conveyor having a regular polygonal outline with the length of each of its sides equaling or approximating the length of a band 113, as considered in the circumferential direction of the conveyor. It is further clear that the pneumatic cylinder 7*b* can be replaced with a hydraulic cylinder, with an electromagnet having an armature corresponding to the piston rod 7*a*, or with a servomotor having a pinion which meshes with a rack corresponding to the piston rod 7*a*. Analogously, the drive 104 can include an electric motor, a fluid-operated motor or a rotary electromagnet, and the same holds true for the drive 11 which pivots the lever 9 for the wire 8. Furthermore, and as actually shown in FIG. 1, the parts 4, 5, 15 and 9 can receive motion from different types of drives including an electric motor (104), a pneumatic motor (7*b*), and an electromagnet (11). The exact details of the monitoring or detecting apparatus 107 form no part of the present invention; all that counts is to insure that the apparatus 107 is capable of detecting flaws or weaknesses in the film 13 and of actuating the parts 7*b*, 11, 104 with such a delay that the tap 3 is advanced, that the leader 3*a* of the tape 3 is severed and that the band 113 at the station TS is applied at the exact moment when a damaged or defective portion 13*a* of the film 13 is located between the rollers 14.

It is normally desirable to index the conveyor 5 through angles of predetermined magnitude. This can be achieved by providing a suitable detent structure which yieldably holds the conveyor 5 against rotation when a groove 12 is in exact register with the wire 8 on the lever 9. The detent structure of FIG. 1 comprises a leaf spring 105 which is secured to the frame 205 of the apparatus and has a suitably configurated free end portion which can snap into one of several notches 5*e* provided in one end face of the conveyor 5. The conveyor 5 is provided with one notch 5*e* for each of the grooves 12. It is also possible to provide a detent structure which automatically releases the conveyor 5 when the prime mover 104 is set in motion; for example, such detent structure may include the leaf spring 105 and an electromagnet (not shown) which is energized when the prime mover 104 is started by the monitoring apparatus 107 to thereby disengage the spring 105 from the adjacent notch 5*e*.

It will be readily appreciated that the improved apparatus can be used with equal advantage for the application of adhesive-coated bands to commodities other than defective or damaged film portions 13*a*. Furthermore, the apparatus can be used to apply bands 113 at regular or irregular intervals in accordance with a predetermined schedule, for example, to apply adhesive-coated labels to discrete commodities in the form of cans, boxes or the like. In fact, if the drive 11 is designed to pivot the lever 9 at a relatively high frequency, and if the pneumatic cylinder 7*b* is designed to reciprocate the ram 15 at the same high frequency, the prime mover 104 can rotate the roll 4 and the conveyor 5 at a constant rate, i.e., not in stepwise fashion. The apparatus of FIG. 1 can be used with advantage to apply bands to junctions between successive films of a series of films which are to be spliced together prior to transport through a developing machine.

FIG. 2 shows a portion of a second apparatus which is designed to apply adhesive-coated bands to both sides of a photographic film 13 or the like. The rollers 14 guide the film 13 in such a way that a portion 13*a* of the film extends through two neighboring transfer stations $TS_1$ and $TS_2$ which accommodate discrete suction conveyors 5 and 5'. The two conveyors are located at the opposite sides of the portion 13*a*, i.e., one thereof is turned through 180° with respect to the other conveyor. The conveyors 5, 5' cooperate with discrete applicators 7, 7' and with discrete guide rolls (not shown). The film portion 13*a* between the two rollers 14 is straight, and the left-hand roller 14 is driven by a device 16 through increments of predetermined length, namely, in such a way that the section of film portion 13*a* which has been provided with a band while dwelling between the conveyor 5 and applicator 7 is thereupon moved between the conveyor 5' and applicator 7' to receive a second band which is applied exactly opposite the first band. Such mode of applying pairs of adhesive-coated bands is often desirable to reinforce the damaged part of a film 13 in order to avoid tearing in response to application of substantial tensional stresses, for example, during transport of the film through a developing machine. The automatic drive 16 may include a motor which rotates the left-hand roller 14 through a predetermined angle in response to return movement of the ram 15 of the applicator 7 to its retracted position; this insures that the section of film 13 which was located between 5 and 7 is moved between 5' and 7' before the ram 5' is caused to perform a working stroke.

FIG. 3*a* shows a further apparatus which can apply adhesive-coated bands to both sides of a film 13. The apparatus comprises two polygonal suction conveyors 5A, 5A' which are located exactly opposite each other and each of which has six sides 19, 19' of identical length, as considered in the circumferential direction of the respective conveyor. The conveyors 5A and 5A' are movable simultaneously toward each other so that each thereof applies a freshly severed band to the respective side of the film portion therebetween. It is also possible to move only one of the conveyors 5A, 5A' toward the other conveyor so that the film portion between the conveyors 5A, 5A' picks up a band from the fixedly mounted (but indexible conveyor) and receives a band from the other conveyor. FIG. 3*a* shows an arm 20 which is movable in directions indicated by a double-headed arrow 21 so as to press the film 13 against the adjacent side 19' of the conveyor 5A' whereby the band which is being attracted to the side 19 is caused to adhere to the respective side of the film. The arm 20 can be reciprocated by an electromagnet, by a rack and pinion drive, or by any other suitable means. The two severing means (not shown) cooperate with the conveyors 5A, 5A' to simultaneously sever adhesive-coated bands from the leaders of two discrete tapes, one for each of the two suction conveyors. The sides 19 and 19' of the conveyors 5A and 5A' are flat. These conveyors can be indexed by a common prime mover, not shown, which causes them to rotate in the same direction or in opposite directions but through identical angles.

The reference character 18 denotes a transporting mechanism which moves the film 13 lengthwise.

In the apparatus of FIG. 3*a*, the conveyor 5A constitutes a component part of an applicator which contacts the film with the bands on the conveyor 5A'.

FIG. 3*b* illustrates a portion of an apparatus which is practically identical with the apparatus of FIG. 3*a*, except that the suction conveyor 5 (which is preferably identical with the suction conveyor of FIG. 1) cooperates with a modified suction conveyor 5B resembling the conveyor 5A or 5A' but having six identical concave sides 19B. The radii of curvature of the concave sides 19B are preferably identical with the radius of the peripheral surface of the suction conveyor 5. When the conveyor 5 is caused to move against the conveyor 5B or vice versa, a concave side 19B cooperates with the adjacent portion of the peripheral surface of the conveyor 5 (between two grooves 12, not shown in FIG. 3*b*) to effect a simultaneous application of two adhesive-coated bands to the opposite sides of that section of the film 13 which is located between the conveyors 5 and 5B.

It will be noted that the conveyors 5A, 5A' of FIG. 3*a* and the conveyors 5, 5B of FIG. 3*b* have complementary sides or peripheral surfaces which insure that the pairs of bands are applied from end to end, i.e., that each portion of the adhesive-coated side of the respective band is properly attached to the film portion between the conveyors 5A, 5A' or 5, 5B.

The automatic monitoring means arranged to scan the webs and to arrest them while defective portions thereof are located at said transfer station may be constructed according to the invention described in the U.S. Pat. No. 2,699,676.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for attaching adhesivecoated bands to selected portions of elongated webs, particularly to weakened portions of photographic films, comprising positioning means arranged to locate successive portions of a web at a transfer station; a rotary suction conveyor having a peripheral surface provided with spaced-apart axially parallel grooves, said conveyor being disposed at said transfer station and being normally spaced apart from a web portion which is located at said station; a supply of adhesive tape; means for feeding the tape from said supply to said conveyor so that the latter attracts the leader of the tape; means for severing the leader so that the latter yields a succession of adhesive-coated bands, including a heated wire and means for moving the wire sideways against the leader of the tape on said conveyor so that the wire melts the leader and thereby effects the separation of a band therefrom, said wire being arranged to enter with clearance one of said grooves during severing of the leader, and said moving means maintaining said heated wire parallel to the axis of said conveyor prior to, during, and subsequent to said heated wire entering each parallel groove; means for driving said conveyor so as to place successively formed bands into register with successive web portions at said stations; and applicator means for connecting the web portion at said station with the respective and so that the band adheres to the web portion.

2. Apparatus as defined in claim 1, wherein said supply comprises a roll of convoluted tape one side of which is coated with adhesive.

3. Apparatus as defined in claim 1, wherein said applicator means comprises a member arranged to move the web portion at said transfer station into contact with the registering band on said suction conveyor.

4. Apparatus as defined in claim 1, wherein said peripheral surface of said suction conveyor is a substantially circular cylindrical peripheral surface.

5. Apparatus as defined in claim 1, wherein said suction conveyor has a regular polygonal outline with a plurality of sides each having a length approximately or equaling the length of an adhesive-coated band, as considered in the circumferential direction of said conveyor.

6. Apparatus as defined in claim 1, wherein said suction conveyor has a plurality of suction ports disposed between said grooves, the suction ports between said grooves being nearer to each other than to the respective grooves and said leader being attracted to said conveyor by said suction ports.

7. Apparatus as defined in claim 1, wherein said means for feeding the tape comprises a toothed guide roll whose teeth contact the adhesive-coated side of the tape.

8. Apparatus as defined in claim 1, further comprising drive means for said applicator means, for said conveyor, for said feeding means and for said severing means, at least one of said drive means comprising a pneumatic motor.

9. Apparatus as defined in claim 1, further comprising drive means for said applicator means, for said conveyor, for said feeding means and for said severing means, at least one of said drive means comprising an electric motor.

10. Apparatus as defined in claim 1, further comprising drive means for moving said conveyor and said feeding means stepwise.

11. Apparatus as defined in claim 1, further comprising drive means for moving said conveyor stepwise and detent means for yieldably holding said conveyor against movement, at least while said conveyor is not moved by said drive means.

12. Apparatus as defined in claim 1, further comprising drive means for moving said feeding means and said conveyor at different speeds and/or through different distances so that the extent to which said tape is advanced by said feeding means is less than the extent to which a severed band is advanced by said conveyor.

13. Apparatus as defined in claim 1, wherein said severing means further comprises means for tensioning said wire.

14. Apparatus as defined in claim 1, wherein said applicator means comprises a fluid-operated ram arranged to move the web portion at said transfer station against the registering band on said conveyor.

15. Apparatus as defined in claim 1, wherein said applicator means comprises a second suction conveyor located opposite said first mentioned suction conveyor, second feeding means for supplying tape to said second conveyor, and second severing means cooperating with said second conveyor to sever the tape supplied by said second feeding means, said applicator means further comprising means for moving at least one of said conveyors toward the other conveyor so that a web portion between said conveyors receives a pair of bands at the opposite sides thereof.

16. Apparatus as defined in claim 15, wherein said conveyors have complementary peripheral surfaces.

17. Apparatus as defined in claim 2 wherein said means for feeding the tape from said supply to said suction conveyor comprises a driven guide roll, said peripheral surface of said conveyor contacting the other side of the tape and being provided with suction ports, and further comprising suction generating means which is connected with said ports so that the ports attract the leader of the tape.

18. Apparatus as defined in claim 1 for applying pairs of adhesive-coated bands, further comprising drive means for moving successive web portions from said first mentioned transfer station to a second transfer station, a second rotary suction conveyor at said second transfer station, said first mentioned conveyor being located at one side and said second conveyor being located at the other side of the path along which the web portions are moved between said stations, second feeding means for supplying tape to said second conveyor, second severing means cooperating with said second conveyor to subdivide the tape fed by said second feeding means into adhesive coated bands, and second applicator means cooperating with said second conveyor to contact the web portions at said second station with the registering bands on said second conveyor.

19. Apparatus as defined in claim 18, wherein said drive means comprises a driven roller.

* * * * *